United States Patent [19]

Holmquist

[11] Patent Number: 4,731,843

[45] Date of Patent: Mar. 15, 1988

[54] METHOD AND DEVICE OF INCREASING THE EXECUTION SPEED OF CIPHER FEEDBACK MODE OF THE DES BY AN ARBITRARY MULTIPLIER

[75] Inventor: Kurt E. Holmquist, Largo, Fla.

[73] Assignee: Paradyne Corporation, Largo, Fla.

[21] Appl. No.: 814,677

[22] Filed: Dec. 30, 1985

[51] Int. Cl.$^4$ .............................................. H04L 9/00
[52] U.S. Cl. ....................................... 380/29; 380/28; 380/59
[58] Field of Search ............... 178/22.05, 22.07, 22.09, 178/22.10, 22.16, 22.19; 380/37, 29, 23, 25, 28, 47, 50, 59

[56] References Cited

U.S. PATENT DOCUMENTS

| | | | |
|---|---|---|---|
| 4,074,066 | 2/1978 | Ehrsam et al. | 178/22.07 |
| 4,078,152 | 3/1978 | Tuckermann, III | 178/22.07 |
| 4,159,468 | 6/1979 | Barnes et al. | 178/22.19 |
| 4,211,891 | 7/1980 | Glitz | 178/22.19 |
| 4,274,085 | 6/1981 | Marino, Jr. | 178/22.07 |
| 4,322,577 | 3/1982 | Brändström | 178/22.05 |
| 4,447,672 | 5/1984 | Nakamura | 178/22.19 |
| 4,520,232 | 5/1985 | Wilson | 380/50 |

OTHER PUBLICATIONS

"Computer Encryption and the National Security Agency Connection", Science, vol. 197, pp. 438–440.
FIPS PUB #81 "DES Modes of Operation" 12/2/80.
"Security for Computer Networks" by Davies et al., copyright 1984.

Primary Examiner—Salvatore Cangialosi
Assistant Examiner—Aaron J. Lewis
Attorney, Agent, or Firm—Kane, Dalsimer, Sullivan, Kurucz, Levy, Eisele and Richard

[57] ABSTRACT

In an encryption system comprising DES in a cipher feedback mode of k bits, a plain text bit stream is fed into n individual DES encryptors. The DES encryptor operates in parallel from a common input register containing cipher text bit streams so that the overall throughput of the system is increased approximately by a factor of n. If k=1 then the system is self-synchronizing.

4 Claims, 4 Drawing Figures

METHOD AND DEVICE OF INCREASING THE EXECUTION SPEED OF CIPHER FEEDBACK MODE OF THE DES BY AN ARBITRARY MULTIPLIER

BACKGROUND OF THE INVENTION a. Field of Invention

This invention pertains to a method for increasing the speed of a device used for encrypting and decrypting data using the DATA ENCRYPTION STANDARD (DES) in the cipher feedback mode. b. Description of the Prior Art The Data Encryption Standard is promulgated by the National Burear of Standards as defined in FIPS publication PUB46, dated Jan. 15, 1977. All the approved modes of operation of the DES are based on a basic electronic code book (ECB) algorithm with a block cipher (64 bits in, 64 bits out) consisting of sixteen iterations of a kernel enciphering function which is fairly complex in itself. The highest performance hardware implementation of the algorithm currently available requires at least one clock cycle per iteration and ten additional clock cycles for input and output of each block. This limits the maximum bit rate using 1-bit cipher feedback to approximately 112 KBPS using this device. The conventional techniques used to increase processing speed, namely pipelining or parallel processing cannot be used with the standard cipher feedback mode. Pipelining cannot be used since the results of one iteration of the encryption process must be available before the next iteration can begin. Straightforward parallel processing cannot be used since the data input and output are in the form of a serial bit stream and the results of encryption of one group of k bits are needed before encryption of the next group can begin.

OBJECTIVES AND SUMMARY OF THE INVENTION

A principal objective of the present invention is to provide a high speed encryption method and device using DES, and thereby providing data security.

A further objective is to provide a high speed encryption method and device by making use of existing DES hardware.

Another objective is to provide a high speed DES device and method which may be operated in a cipher feedback mode with 1 to 64 feedback bits.

Yet another objective is to provide a high speed encryption method and device in which each cipher text bit is dependent on previous cipher bits for increased security.

A further objective is to provide a high speed encryption method and device with self-synchronizing capability.

Other objectives and advantages of the invention shall become apparent from the following description of the invention.

The above mentioned objectives are achieved by using multiple DES devices with the same encryption algorithm operating simultaneously on a serial bit stream. The overall processing throughput of the device is approximately multiplied by the number of devices used.

The invention consists of a modification to the cipher feedback mode of operation of the DES. In this mode, the length of the input block to the basic DES ECB algorithm is 64 bits. Cipher feedback mode requires that, for a feedback path width of k bits, the ECB algorithm must be performed once for every k bits encrypted. The maximum encryption/-decryption speed is therefore limited by the minimum time to execute the basic ECB algorithm. The modification proposed here adds $n-1$ DES ECB processing devices, using the same encryption key, and extends the DES input block by $k(n-1)$ bits for a total length of $k(n-1)+64$ bit. Encryption (or decryption) of plaintext (or ciphertext) bits $i$ through $i+nk-1$ takes place simultaneously. Since almost all of the time to perform cipher feedback encryption is used in the ECB algorithm, this system increases the maximum possible execution speed by a factor approaching n. The only processing time not reduced by a factor of n is the time for the additional hardware required to do the shift of ciphertext, plaintext, and input blocks by nk bits instead of just k bits. Since the time to accomplish this is insignificant when compared to the other processing steps, the gain in throughput is very close to n.

The cipher feedback mode using $k=1$ is very important since this is the only approved mode of operation of the DES which is self-synchronizing when used to encrypt serially transmitted data and which is therefore suitable for protocol-transparent encryption. When the modification described here is used in the 1-bit cipher feedback mode, the self-synchronizing property is retained. All n DES devices use the same key. The number of bits between the ciphertext of a given bit and previously transmitted ciphertext used as the DES input block to encrypt/decrypt that bit is constant. Therefore decryption of a bit of ciphertext can take place in any of the n processing blocks so that it is not necessary to maintain any multiple-bit alignments between the encryptor and decryptor.

DETAILED DESCRIPTION OF THE INVENTION

Figure 1:
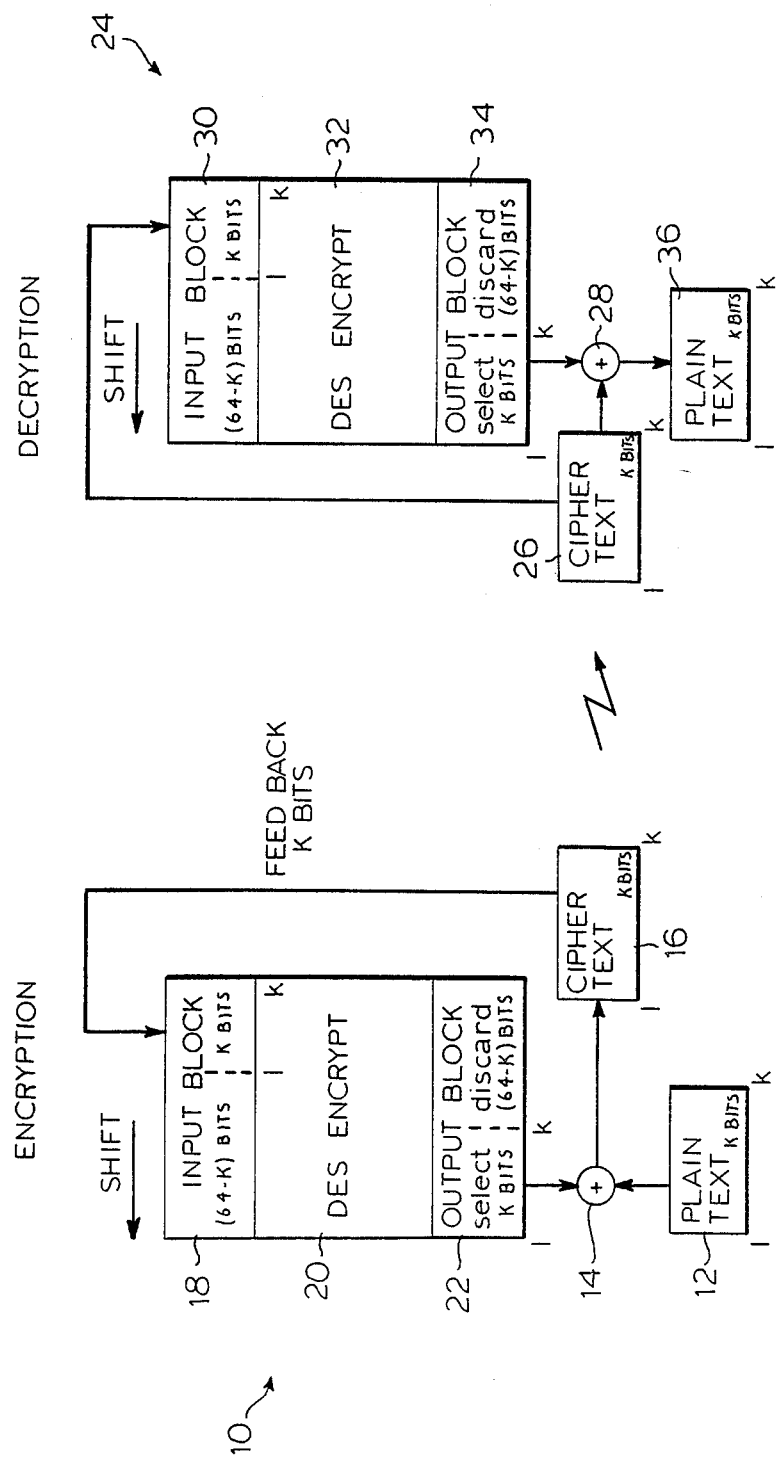
FIG. 1 shows the Data Encryption Standard in a schematic form.

As shown in FIG. 1 in a typical encryptor 10, a block of k bits of plaintext is fed to an exclusive-or gate 14, which generates a block of k cipher text bits 16. The bits from block 16 are fed to an input register 18 which holds the input block. This input block is generated by shifting the contents of register 18 left by k-bits so that the k positions on the right of the register are used to hold the bits from block 16. The input block from register 18 is fed to a DES Encryption circuit 20. This circuit operates in ECB (encryption) mode and performs a preselected algorithm to generate after a time period T an output block in an output register 22. The left k bits from register 22 are used as a second input to gate 14, and the remaining bits of the output block are discarded.

At the decryptor 24, k cipher text bits from encryptor 10 are fed to a cipher text register 26. From this register, the bits are fed to an exclusive-or gate 28 and to the right-most k positions of an input register 30. The input block from register 30 is fed to a DES encryption circuit 32 operated in ECB (encryption) mode, which generates an output block in output register 34. The left k bits from register 34 are also fed to gate 28, and the output of the gate is fed to a plain text register 36. Circuits 20 and 32 initially receive an identical initializing vector and identical key vectors. The encryptor scheme of FIG. 1 encrypts k bits of data at a time.

Figure 2:
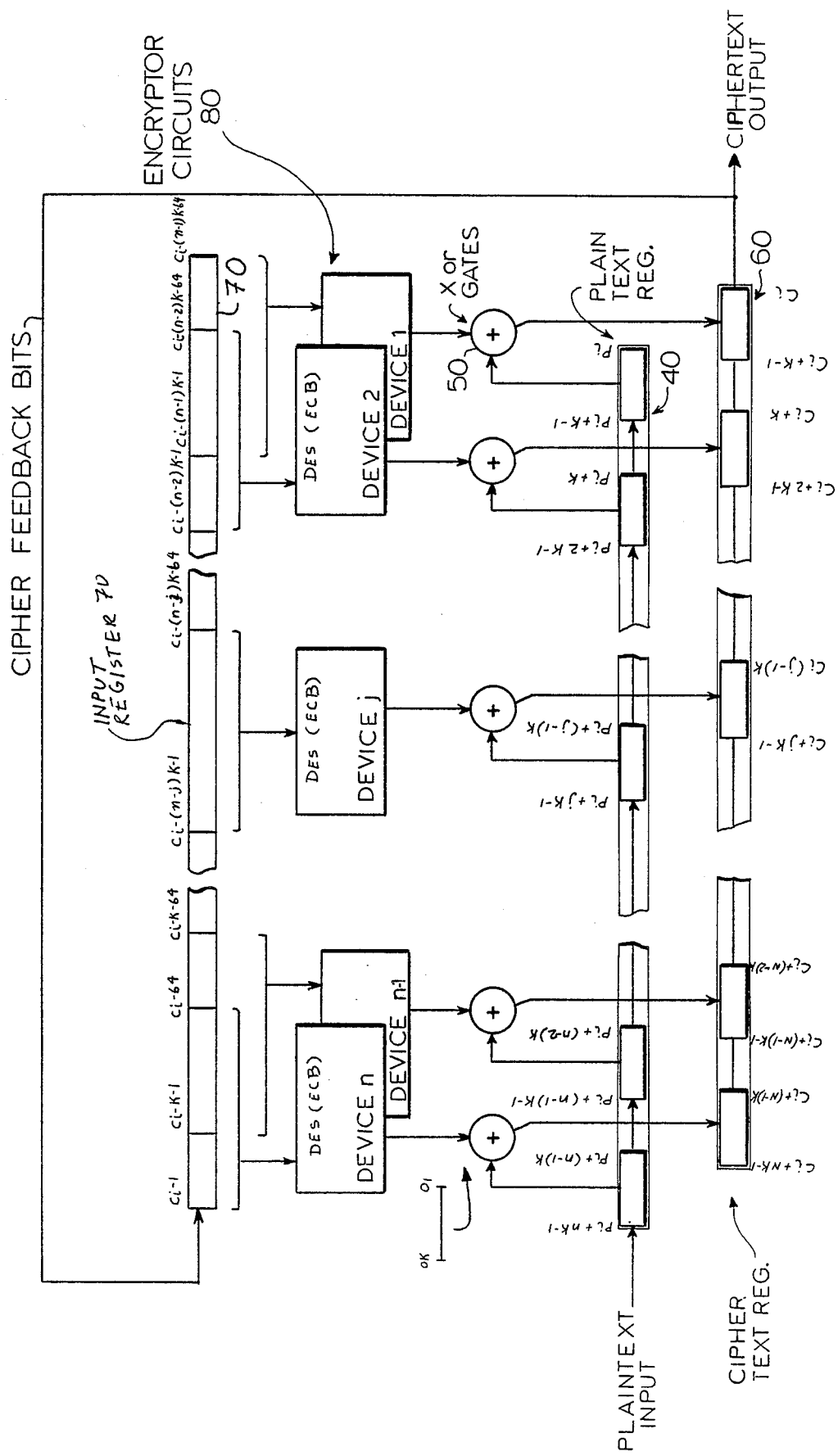
FIG. 2 shows a general example of a data encryptor for generating cipher text in accordance with this invention.

The encryptor of FIG. 2 constructed in accordance with this invention handles nk bits of data at a time where k is the number of feedback bits used in the DES and n is the number of DES sections. An encryptor having n DES sections shall now be described. Plain text bits are first fed into plain text register 40. This register is a serial-in, parallel out register. The n blocks of k bits of plain text register are fed to respective groups of k exclusive-or gates 50. The outputs of these gates are fed in parallel to cipher text registers 60. The output of this cipher text register is fed serially out to the decryptor described below, and to an input register 70 which is $64+k(n-1)$ bits long.

The n encryptor circuits 80 operate in ECB (encrypt) mode and simultaneously process the n respective overlapping input blocks of 64 bits each and after a period of time, T, generate n corresponding output blocks. The leftmost k bits of the n output blocks are used as second inputs to their respective exclusive -or gates 50.

Thus, while the encryptor of FIG. 1 generate only k bits of encrypted data over a period of time T, the encryptor of FIG. 2 generated nk encrypted data bits over essentially the same period of time. (As previously mentioned, the time to load the nk bits of plain text bits into the input register 40, is negligible when compared to T).

Figure 3:
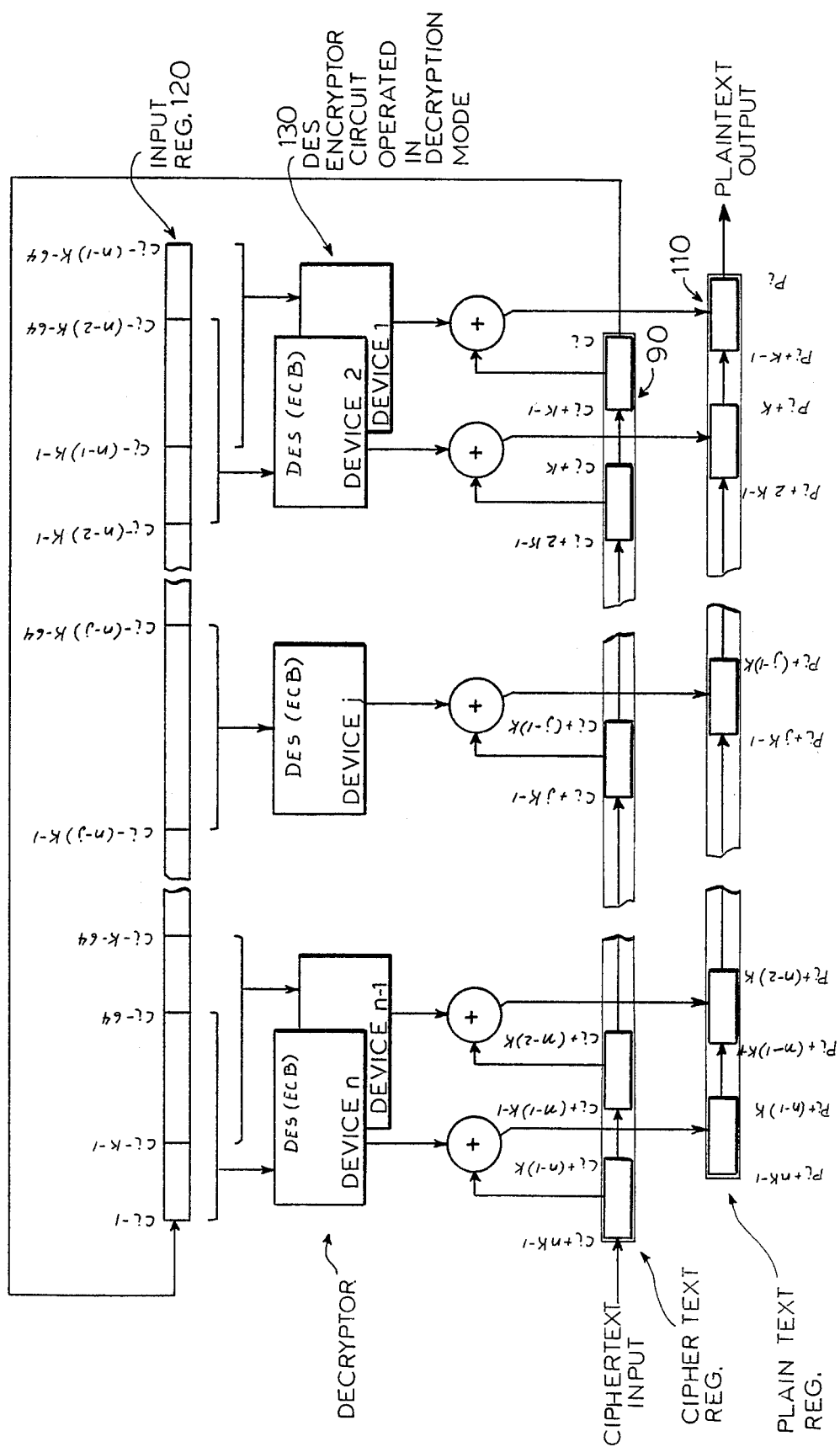
FIG. 3 shows a general example, similar to FIG. 2, of a data decryptor for generating plaintext from the ciphertext produced by the encryptor of FIG. 2.

The decryptor of FIG. 3 comprises a cipher text register 90, which receives serially encrypted data from the encryptor of FIG. 2. The data from the cipher text register is fed to n corresponding groups of k exclusive-or gates 100 and to an input register 120. The output of the gates are fed respectively to plain text register 110. The plain text bit stream is output serially from this plain text register.

Input register 120 holds $k(n-1)+64$ bits which are fed in n parallel blocks of 64 bits each to the n DES encryptor circuits 130, which are being operated in the ECB (encryption) mode. After time period T, the circuits 130 generate n output blocks, k bits of which are each fed to exclusive-or gates 100 as shown.

The operation of the encryptor and decryptor is recapitulated briefly below.

The DES input block which contains previously transmitted ciphertext is $k(n-1)+64$ bits long. It is broken up into n overlapping blocks of 64 bits each with the block for DES device j starting k bits after the block for device $j-1$ starts. The plaintext block consists of n segments of k bits each. All n DES input blocks are input into the n DES devices at the same time. After the DES ECB algorithm has been performed, the k most significant bits of each DES output block are added modulo 2 to the k bits of each corresponding block of plain text to produce n k-bit blocks of cipher text. These nk bits of cipher text are transmitted and are shifted into the DES input block from the left. The next nk bits of plain text are shifted in from the left into the input register and the process starts over again.

Decryption of the ciphertext produced by this method is very similar, the main difference being that the incoming ciphertext is added modulo-2 to the DES output data to produce plain text.

The self-synchronizing capability with $k=1$ is evident if it is noted that there will be $n-1$ bits of cipher text between any cipher text bit and the 64-bit block of cipher text used as the DES input block to generate this cipher text bit regardless of which of the n DES devices do the encryption for this bit. If a total of p bits are lost from the cipher text data stream during transmission, decryption of bit i which was encrypted by device j will now be done by device $j-(p \mod n)$. Likewise if p bits are added to the cipher text stream, decryption will be done by device $j+(p \mod n)$. In either case, after the section of cipher text which borders the added or deleted data has been remove from the decryptor by shifting, the cipher text block which is $n-1$ bits ahead of bit i (bits $i-n$ through $i-n-63$) is the same block used as the DES input to generate the ciphertext. Therefore decryption will be done correctly and the original plaintext will be recovered.

Figure 4:
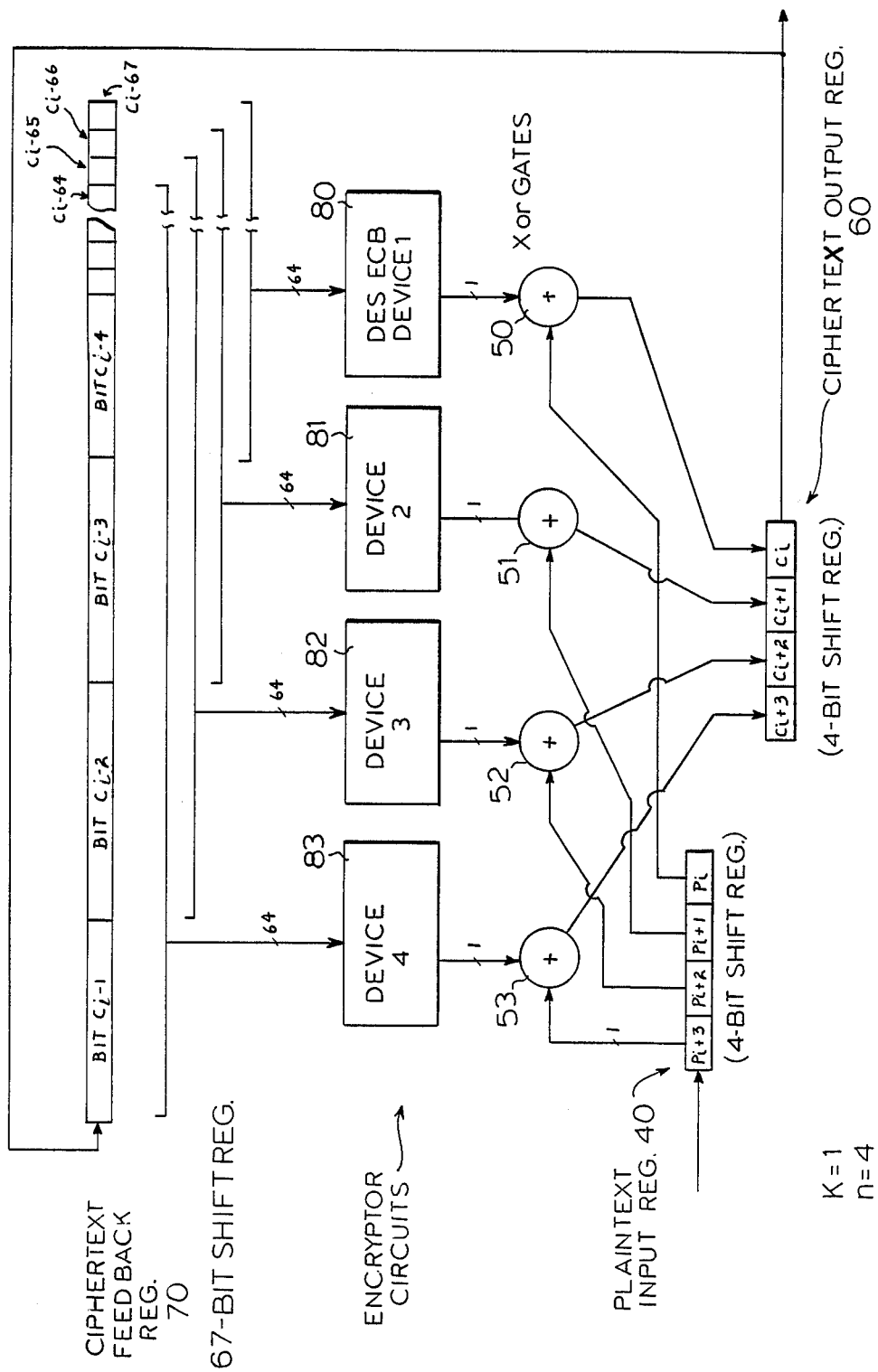
FIG. 4 shows the specific example of the data encryptor of this invention of the case where $n=4$ and $k=1$, for generating cipher text in accordance with this invention.

For a better understanding of the invention, an encryptor with $k=1$ and wing four DES sections ($n=4$) shall now be described. As shown in FIG. 4, such an encryptor comprises a 4-bit serial-in/parallel-out input shift register 40 in which plain text is fed four bits ($P_i$, $P_{i+1}$, $P_{i+2}$, $P_{i+3}$) at a time. For a single bit ($k=1$) cipher feedback mode, each bit from this register is fed to a corresponding XOR gate 50, 51,52,53. The outputs of these gates are feed to a parallel-in/serial-out 4-bit output shift register 60. Thus register 60 contains four cipher text bits ($C_i$, $C_{i+1}$, $C_{i+2}$, $C_{i+3}$). These bits which comprise the output of the encryptor, are also fed back serially to a 67-bit serial-in/parallel-out feedback register 70. The contents of register 70 are partitioned into four 64-bit blocks. Thus if register 70 contains bits $C_{i-1} \ldots C_{i-67}$, four output blocks are generated containing bits $C_{i-4} \ldots C_{i-67}$, $C_{i-3} \ldots C_{i-66}$, $C_{i-2} \ldots C_{i-65}$ and $C_{i-1} \ldots C_{i-64}$ respectively. These four blocks are fed to four DES/ECB encryptors 80, 81, 82, 83 respectively. After a period of time T each DES/ECB encryptor generates a bit which is fed to a second input of XOR gates 50,51,52 and 53, thereby completing the encryption. Thus the device of FIG. 4 encrypts four plain text bits at a time.

Obviously numerous modifications may be done without departing from the scope of the invention as described in the appended claims.

I claim:

1. A data encryption system for encrypting a stream of data bits, comprising:
   a serial in, parallel out register for receiving a stream of plaintext bits;
   a plurality of exclusive-or gates connected in parallel to outputs of said serial in, parallel out register and not in series with each other;
   a cipher text register connected to parallel outputs of said exclusive-or gates and having an output which can be transmitted to a decryptor;
   an input register connected to an output of said cipher text register and functioning to receive in series and store encrypted data blocks, each encrypted data block containing k bits;
   a plurality of encryptor circuits connected in parallel to outputs of said input register and having parallel outputs to said exclusive-or gates and functioning to substantially simultaneously process and then output in parallel selected bits from said encrypted data blocks to said plurality of exclusive-or gates.

2. The data encryption system of claim 1 wherein said input register is $64+k(n-1)$ bits long and wherein n equals the number of said encryptor circuits.

3. A method of encrypting a stream of nk data bits comprising the steps of:

feeding the data bits serially into a serial in parallel out plain text register of nk bits;

combining bits from each k-bit segment from said plain text register with bits from a plurality of encryptor circuits in a plurality of exclusive-or gates connected in parallel between said plain text register and said encryptor circuits and not in series with each other to generate cipher bit blocks;

sending said cipher bit blocks in parallel from said exclusive-or gates to a cipher text register;

outputting said cipher bit blocks from said cipher text register to a decryptor and to an input register;

storing encrypted data blocks in said input register, each encrypted data block containing k bits;

outputting said encrypted data blocks in parallel to a plurality of encryptor circuits;

substantially simultaneously processing said encrypted data blocks in said encryptor circuits; and outputting bits from said processed encrypted data blocks in parallel to said plurality of exclusive-or gates.

4. The method of claim 3 wherein said input blocks comprise 64 bits, and wherein k is between 1 and 64 bits.

* * * * *